(12) United States Patent
Berry

(10) Patent No.: US 11,487,196 B2
(45) Date of Patent: Nov. 1, 2022

(54) IMAGE DISPLAY APPARATUS

(71) Applicant: Elisabeth Berry, London (GB)

(72) Inventor: Elisabeth Berry, London (GB)

(*) Notice: Subject to any disclaimer, the term of this patent is extended or adjusted under 35 U.S.C. 154(b) by 34 days.

(21) Appl. No.: 17/252,945

(22) PCT Filed: Jun. 24, 2019

(86) PCT No.: PCT/GB2019/051781
§ 371 (c)(1),
(2) Date: Dec. 16, 2020

(87) PCT Pub. No.: WO2019/243852
PCT Pub. Date: Dec. 26, 2019

(65) Prior Publication Data
US 2021/0247685 A1  Aug. 12, 2021

(30) Foreign Application Priority Data

Jun. 22, 2018 (GB) ..................................... 1810280

(51) Int. Cl.
*G03B 21/62* (2014.01)
*H04N 9/31* (2006.01)
*G03H 1/22* (2006.01)

(52) U.S. Cl.
CPC .......... *G03B 21/62* (2013.01); *H04N 9/3147* (2013.01); *G03H 1/2202* (2013.01); *G03H 2001/2234* (2013.01)

(58) Field of Classification Search
CPC ...... G03B 21/14; G03B 21/56; G03B 21/606; G03B 21/62; G03H 2001/2223; G03H 1/2202; H04N 9/3147
USPC ............... 353/28, 30, 79; 359/443, 449, 450
See application file for complete search history.

(56) References Cited

U.S. PATENT DOCUMENTS

| 2,952,182 | A | * | 9/1960 | Fassoulis | ............... | G03B 21/60 |
| | | | | | | 353/121 |
| 3,248,165 | A | * | 4/1966 | Marks | .................. | G03B 21/604 |
| | | | | | | 359/479 |
| 6,282,023 | B1 | * | 8/2001 | Bergman | ............. | G03B 21/604 |
| | | | | | | 359/449 |

* cited by examiner

*Primary Examiner* — William C. Dowling

(57) ABSTRACT

Apparatus comprising a projection device for projecting an image, a transparent projection screen for displaying the projected image and a secondary image surface on an opposite side of the screen to the projector device and where an undesired secondary image appears. Different arrangements for the management of the undesired secondary image are disclosed.

20 Claims, 8 Drawing Sheets

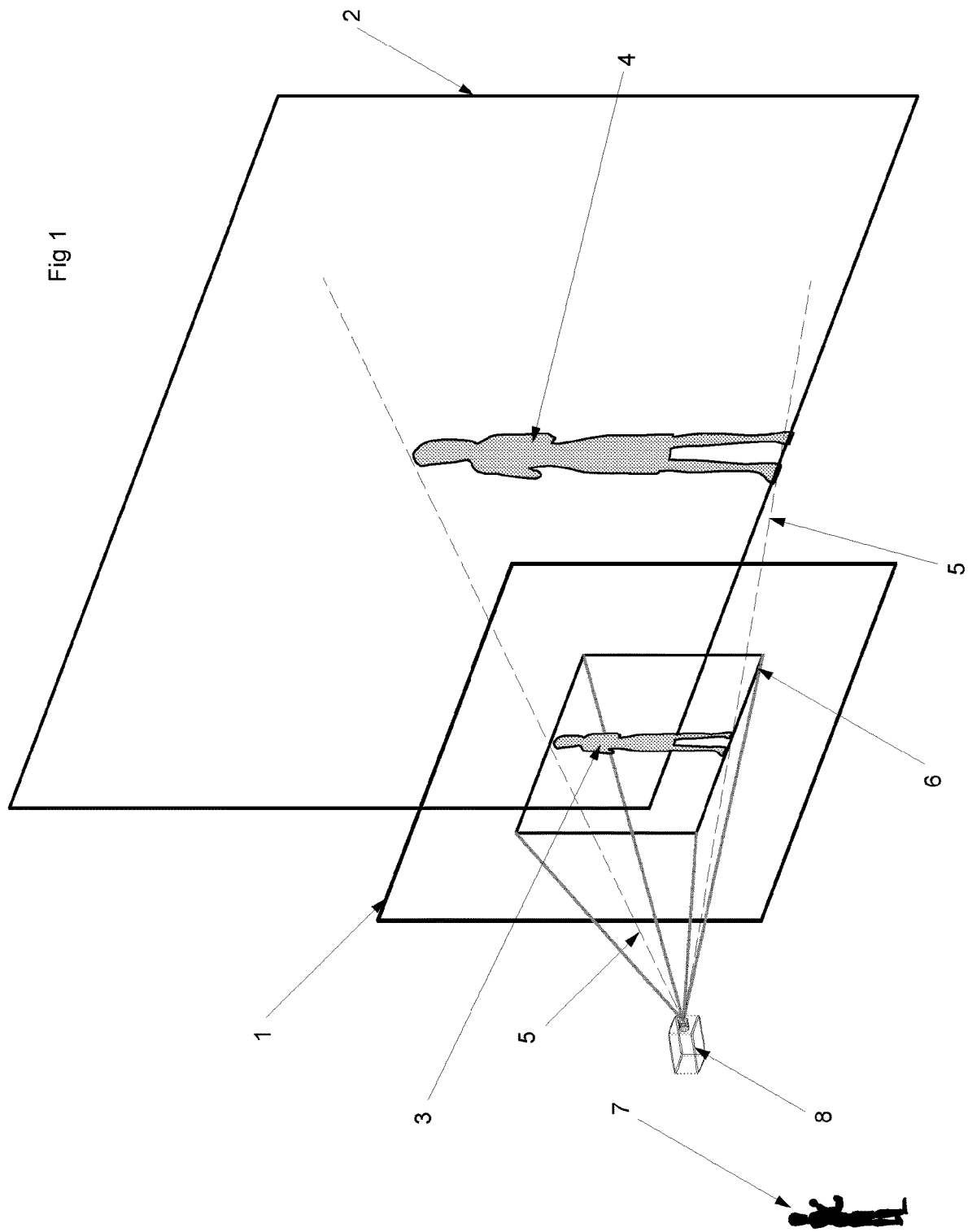

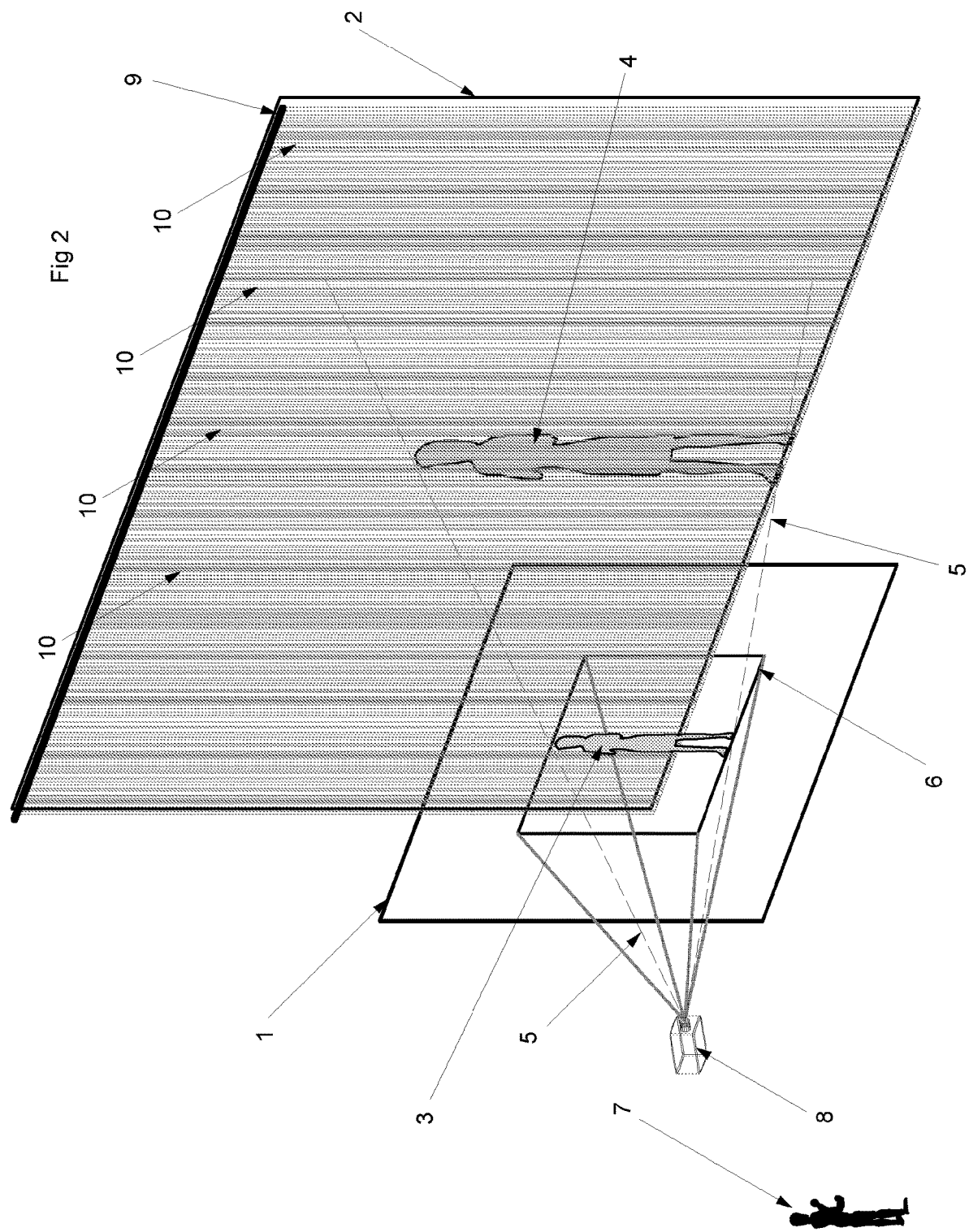

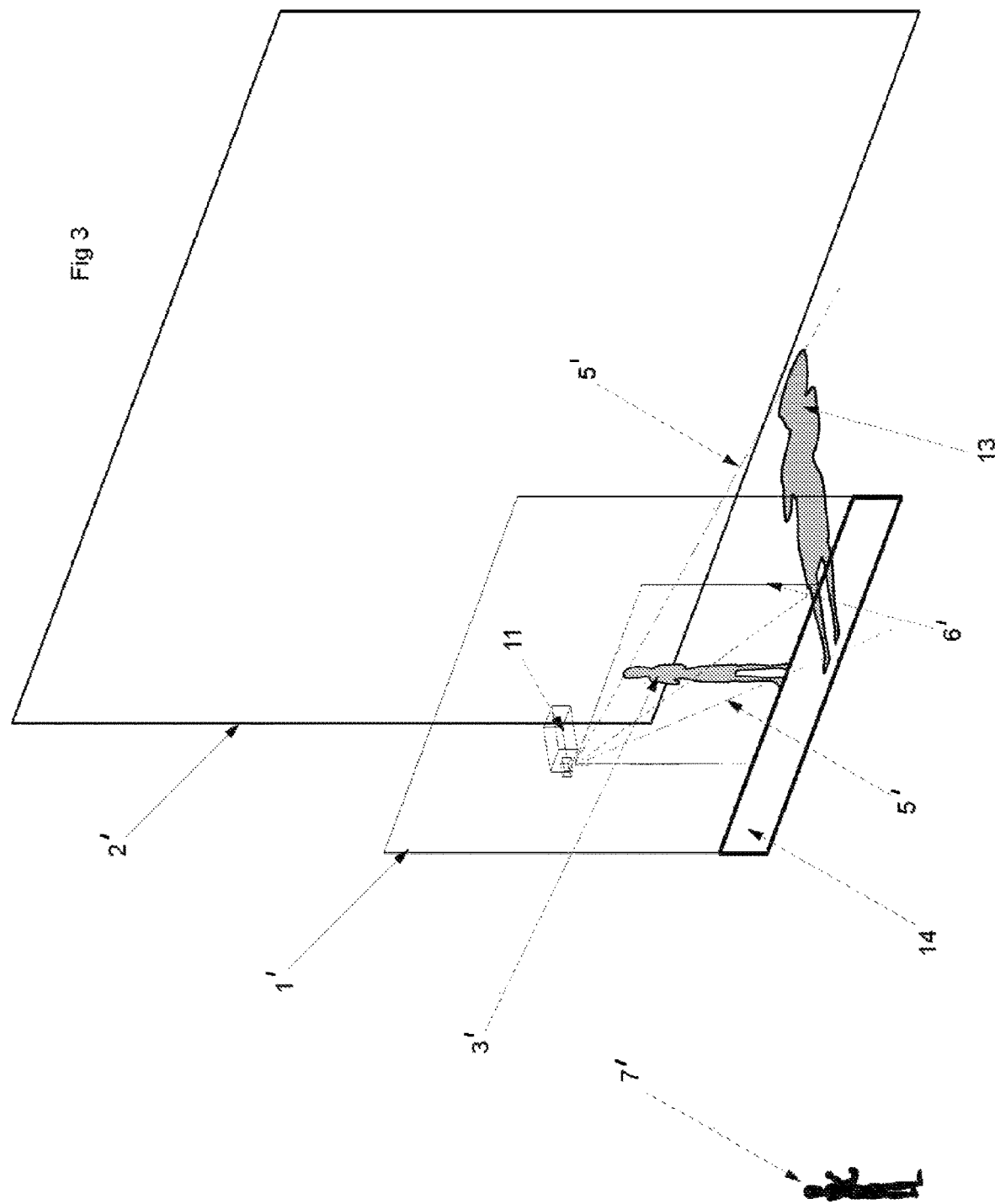

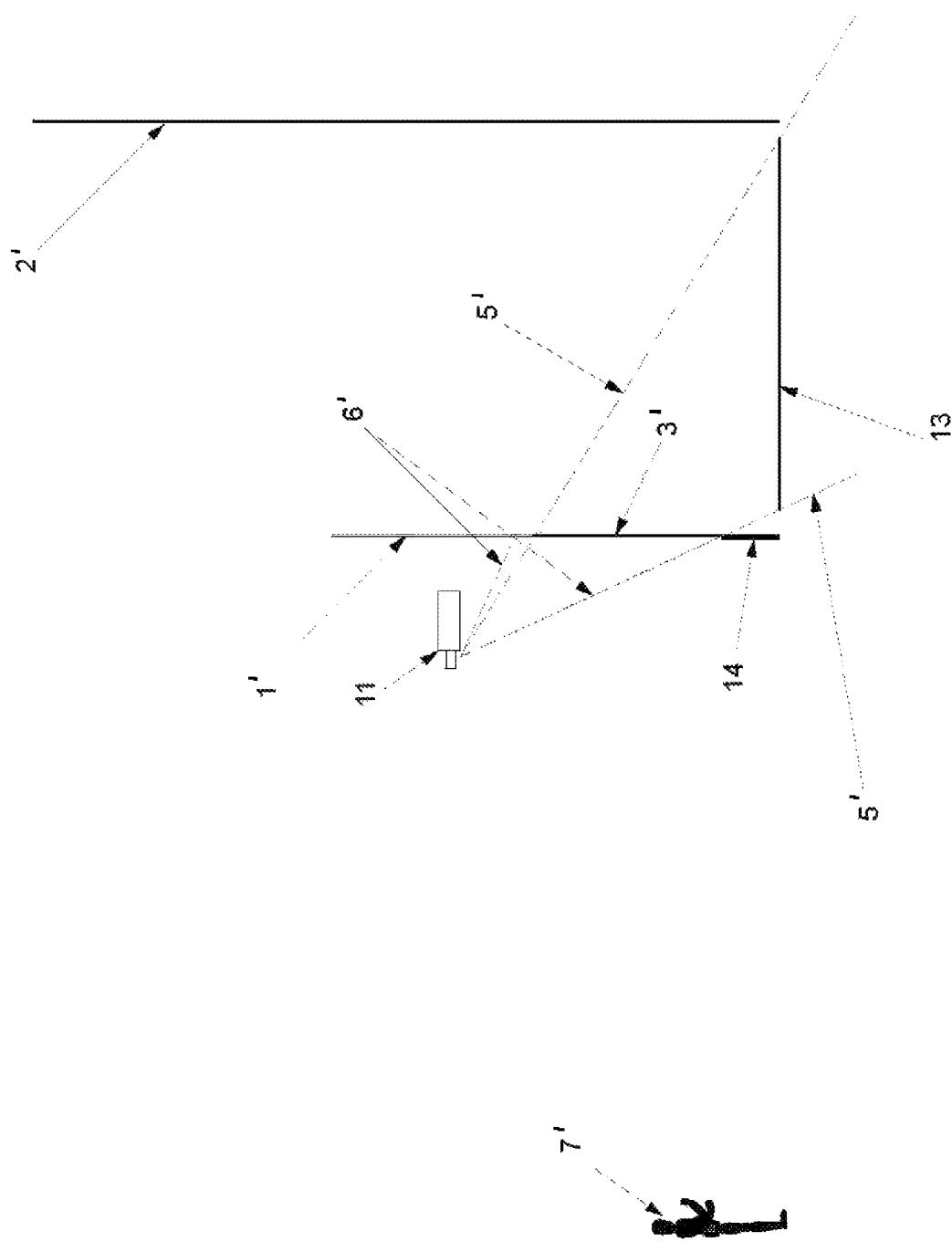

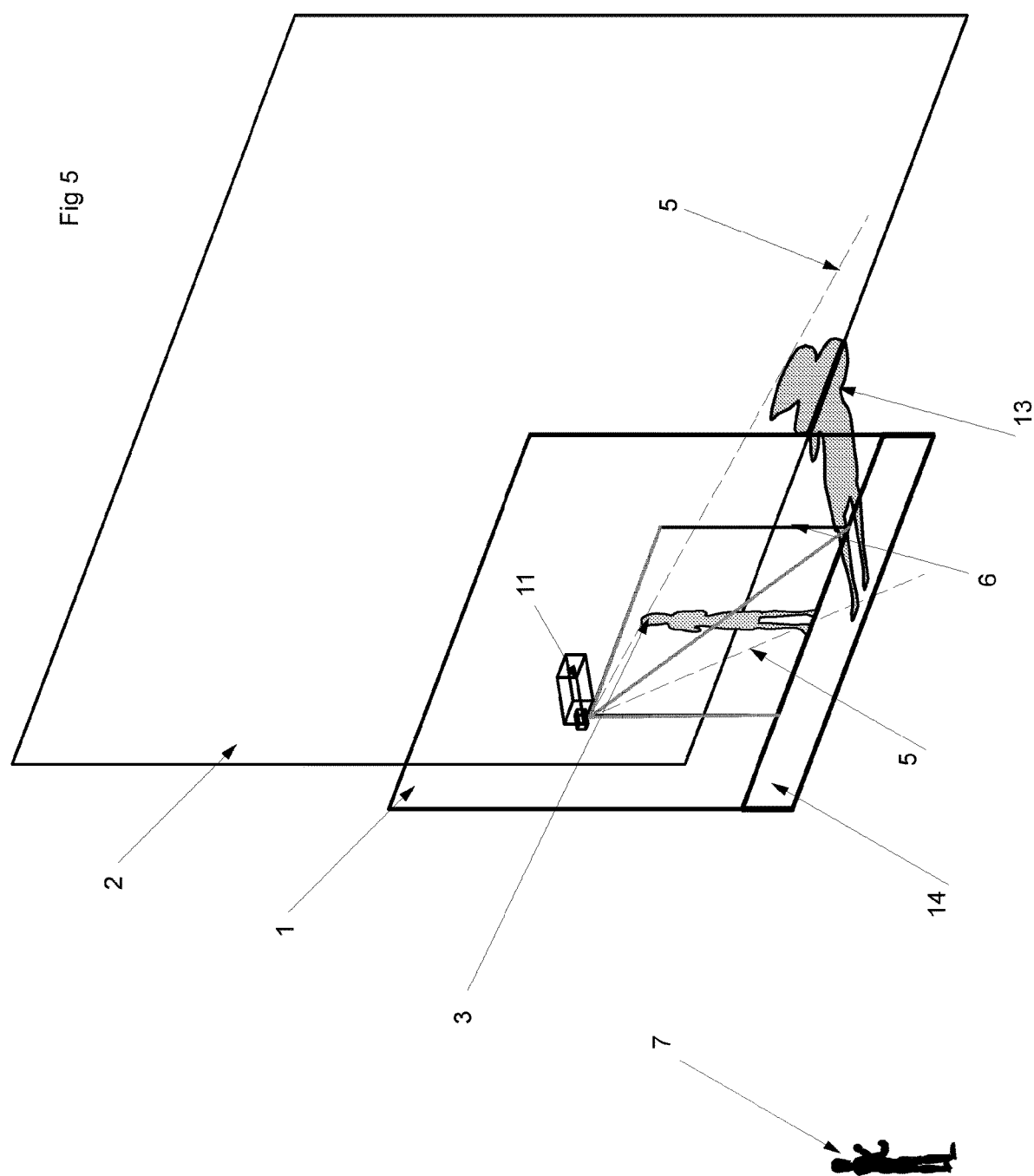

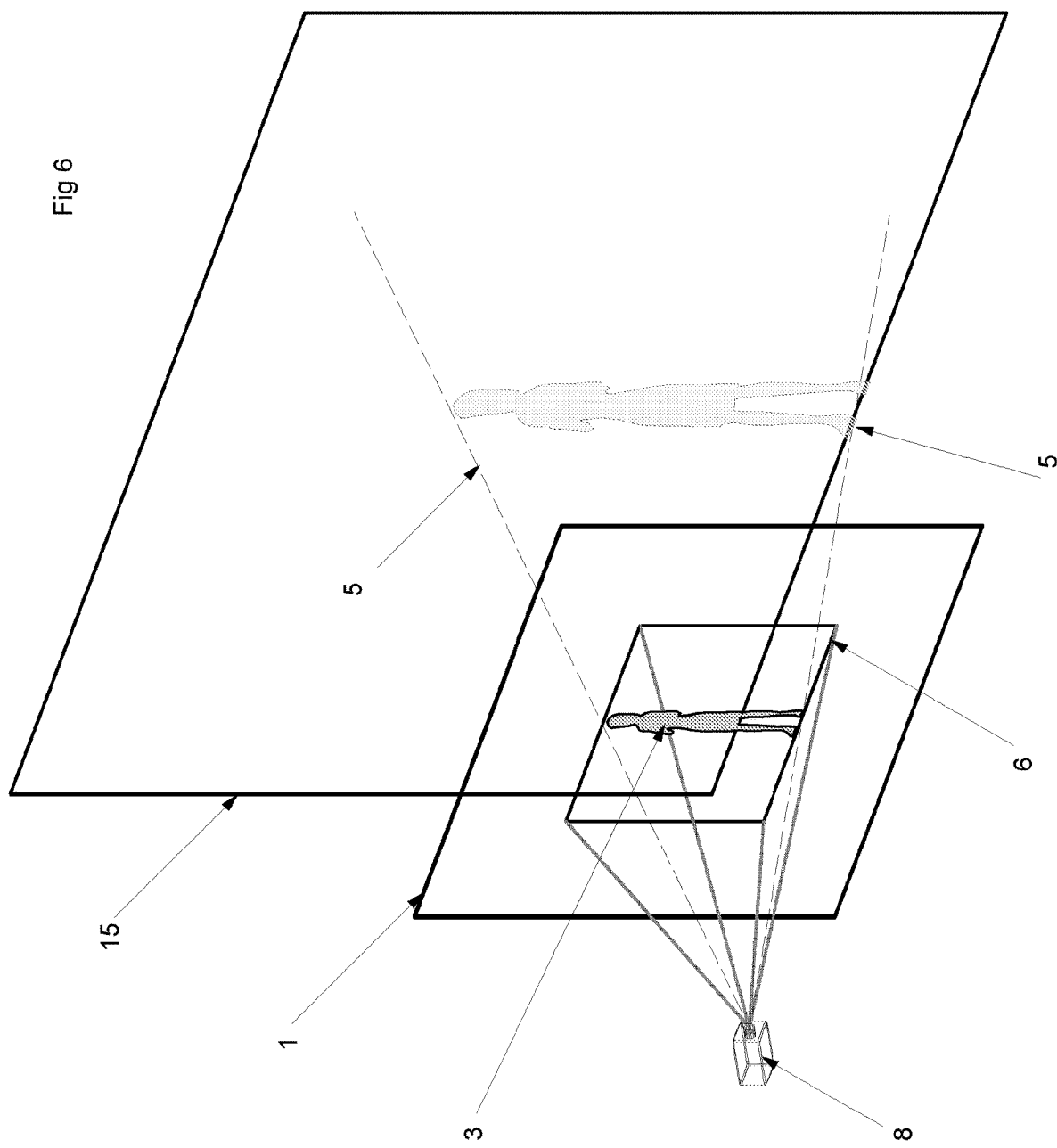

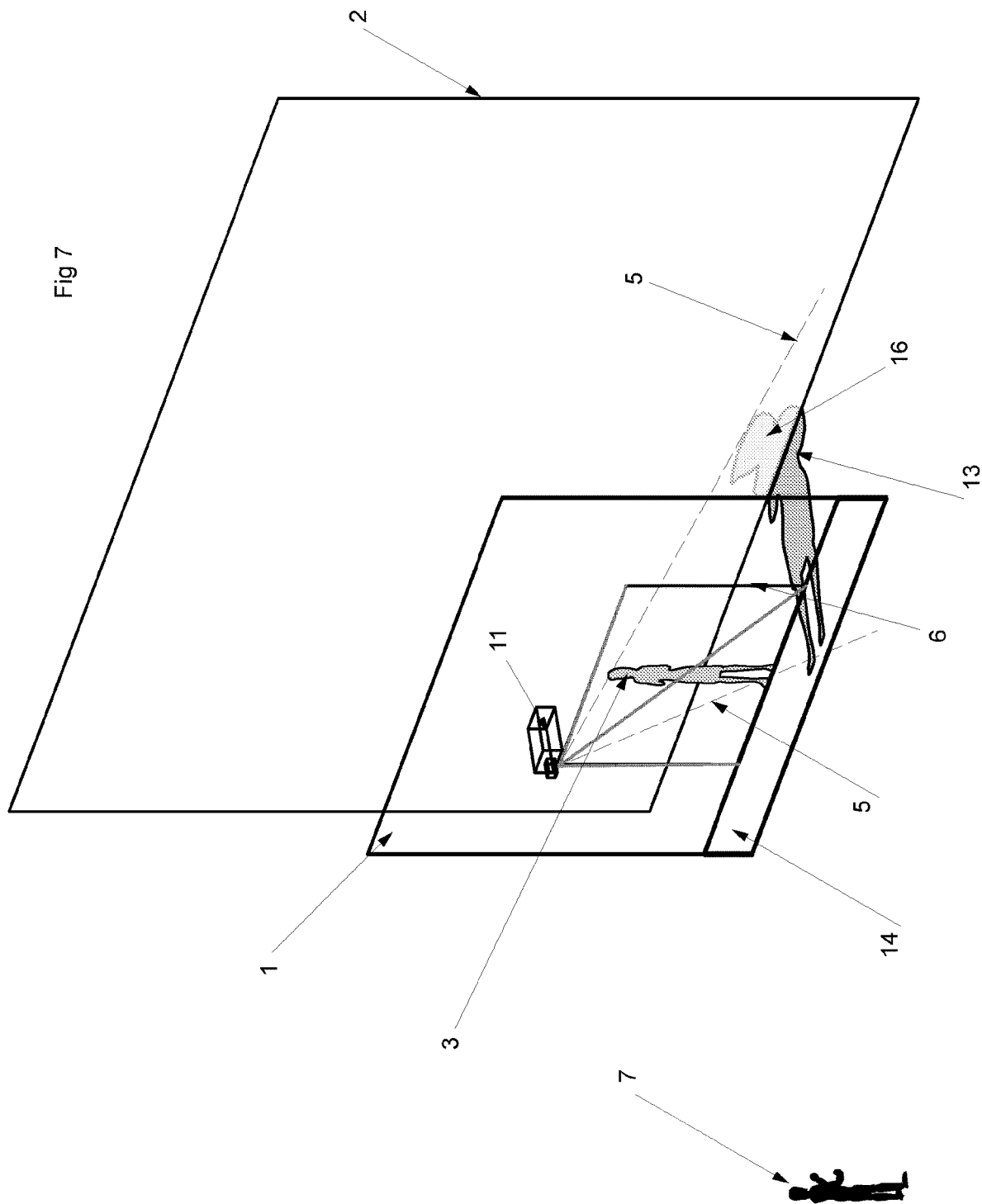

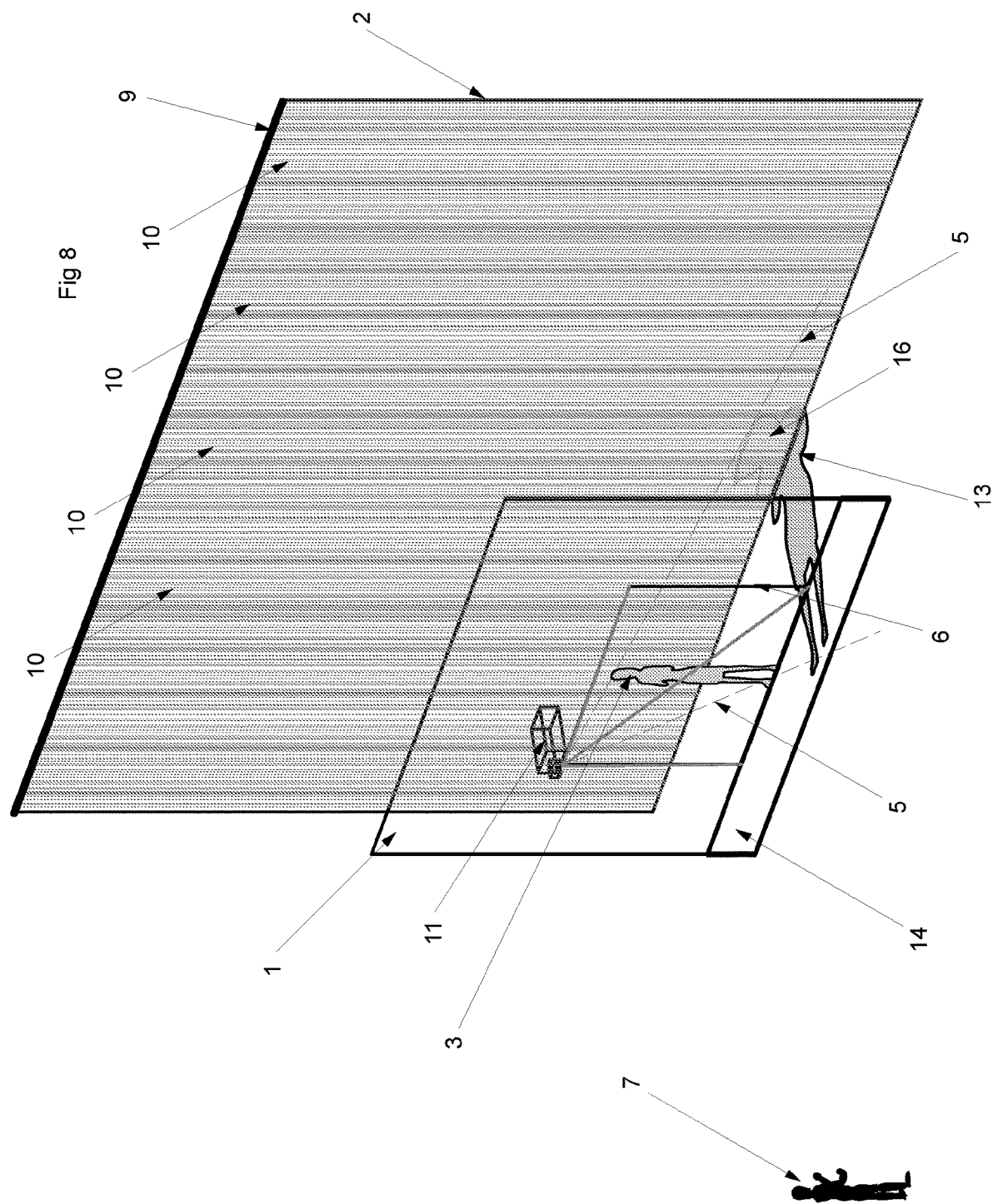

IMAGE DISPLAY APPARATUS

THE FIELD OF THE INVENTION

The present invention relates to the use of transparent and semi-transparent projection surfaces used to project video images thereon which are presented to a viewer in such a way that they look 3D and create a hologram-type effect.

Herein, new arrangements to make suitable screen surfaces and ways to improve the overall effect using new lighting workflows and by the better management of unwanted secondary images are disclosed.

New lighting workflows are also disclosed that are suitable for both direct projection and Pepper's Ghost-type holograms.

THE BACKGROUND OF THE INVENTION

It is desirable to create an effect in which an object or person that is not present at a particular location appears as if they are. This might be used for many communication and entertainment purposes, such as allowing deceased performers to appear in front of an audience, or for someone to make a speech or presentation at an event or in a meeting where it is not practical or affordable for them to attend in person. Furthermore, this capability allows for real-time video telepresence to take place between parties where one, two or more remote parties appear to other parties as if they are real people actually in the room with the person or people that they are communicating with.

U.S. Pat. No. 5,865,519A describes a system that uses an angled polymer foil to create a Pepper's Ghost effect, namely a reflection that can be made to appear like a real person or object on a stage or similar presentation environment. More recently, techniques have been used in which an image is directly projected onto a transparent yet reflective surface in order to create a similar effect more conveniently and at reduced cost.

This 'direct projection' technique works by projecting an image onto a transparent or semi-transparent screen presented in front of a 3-dimensional background such as a stage or display area. The reflective characteristics of the screen mean that the image is reflected back to a viewer, and the screen looks solid where the projections land. When the background is lit, the transparency of the screen permits a viewer in front of the screen to see the background through the parts of the screen that don't have an image projected onto them, and the screen surface itself becomes invisible to the viewer. Thus, the whole screen either looks solid owing to the presence of projections or it disappears owing to the lighting behind it, and the solid-looking image appears to inhabit the 3-dimensional space and is perceived to have real depth. Since no other part of the screen is evident, it is not readily possible to see how the illusion is created. If the whole scene is correctly lit and the video content is of sufficiently high quality, the video image projected appears to the viewer to be a real object or person inhabiting the space defined by the background, and a holographic effect is produced. Although this is not technically a real hologram, it is commonly called such, and the use of this term in this document refers to an effect produced in this way. There are different ways to produce the content for a video hologram effect. They include filming and recording an object or person, creating a digital model of an object or person which is then animated (CGI), live streaming an object or person, and using a gaming engine to create 3D entities in real time.

As is the case with a Pepper's Ghost arrangement, it is very important that the lighting around the hologram is correct or the effect will not be convincing or impressive.

There are many projection surfaces that are suitable. They are all screen surfaces that combine the qualities of being at least partially transparent to light positioned behind the screen, and sufficiently reflective to light projected directly onto it such that a credible video image can be created. The transparency may come about due to the intrinsically transparent nature of the material itself, or due to the presence of many holes in a gauze or mesh-type substrate. Examples of intrinsically transparent screens include glass and various rigid or flexible plastics such as mylar (Registered Trade Mark). Gauzes include flexible or hard nets or meshes which may be made of wire, fabric or other materials, and may include, in its structure, a metallic component to improve the reflectivity, and hence the brightness of the projections. However, it is to be understood that these methods refer to any transparent or semi-transparent projection screen surfaces suitable for the purpose of being directly projected onto and creating a hologram-type effect. For convenience we will refer to them as transparent, although it is to be understood that semi-transparent screens are included. Projection can be from the viewer side or from the opposite side of the screen, so both front-projection and rear-projection techniques can be used. It is also to be understood that the screen may be tinted in order to add contrast to the image to help mitigate the effects of daylight or other reasons, and provided that some degree of transparency still exists, a tint may be present. Skill is needed to ensure that the areas of lighting behind the screen and the light projected onto the screen do not interfere with each other from any audience viewpoint as this will compromise the effect (the audience may see both sets of light together, and the image will go transparent in these parts).

By definition, any screen that has transparency allows some light to pass through it. When an image is projected onto a transparent screen, the projection will appear as a primary and intended image on the screen, but the projected light will also travel through the screen and make a secondary and generally undesirable image on the next surface that it hits, hereinafter generally called the secondary image surface unless a particular surface is mentioned. Depending on the projector position and the lens, if the projector is located on the viewer's side of the screen, this image may fall on a surface in the area behind the projected hologram-type image where it has potentially two major detrimental effects. Firstly, the secondary image is visible as a constant 'visual echo' of the primary image, which detracts from the credibility of the primary image as being a real, solid and spontaneous entity in the real world. Secondly, as the secondary is also made up of projected light, it may also compromise the quality of the primary image by making it go transparent such that the secondary image is visible through parts of the primary image where the primary and the secondary images line up from the perspective of one or more members of the audience. This is clearly undesirable.

It is often better that the secondary image lands on the floor where it may not be visible to an audience at all. If they can see it at all, the audience's view of the secondary image on the floor is generally highly distorted so it doesn't actually look like the same image, and in fact just looks like a reflection. This effect can in some cases be used to enhance the reality of the effect trying to be achieved, and can be improved further by including an area of shiny reflection in the content itself that appears like the subject is itself being reflected in a shiny floor. While it is obvious that use of a black floor will help minimise a secondary image landing on it, it has long been understood that a black shiny floor will actively bounce the light from a secondary image away from the viewer and make the secondary image even less visible. This shiny surface technique can also be used on side or angled walls where light creating the secondary image will bounce away from the viewer if they are covered in or made from a dark coloured or black shiny material. However, this is not a successful technique on a back wall facing the viewer as the secondary image surface owing to the fact that the light bounces straight back towards the viewer, and the secondary image would be visible as a result. It would therefore be beneficial to find a means that could be used to substantially reduce the appearance of the secondary image on the back wall or other surface facing a viewer where other techniques currently do not work sufficiently well.

A range of projectors are available that either incorporate or can accept ultra-short throw (extreme short throw) off-axis lenses. For example, Optoma's ZH400UST is a small 4000 ANSI lumens projector that is good for small hologram images and has a fixed extreme short throw lens built in; Panasonic's ET-75LE90 lens is one that is designed to fit a bulb or preferably laser projector which is very suitable for full size images of human beings or cars, for instance. The off-axis light path of these systems means that the projected light leaves the lens at an angle which is not parallel to the projector, but at an angle to it, and the image is typically bounced off a mirror either just inside or actually outside the body of the projector. The wide angle of these extreme short throw lenses allow the projector to be placed very close to the projection screen and still make an in-focus life-size image thereon, and if the projector is positioned up in the air, an off-axis lens will mean the secondary image is able to be 'dumped' onto the floor without tilting the projector. The image on the screen will not suffer distortion as this is an intended orientation of the device, and the projector is positioned conveniently above the image where it is less obvious to a viewer. Conversely, a projector positioned at floor level with an off-axis lens will 'dump' the secondary image onto a ceiling surface where it might also be easy to conceal with masking or other means, and again, the image will be perfect while the projector remains sitting on the floor.

If an on-axis lens were to be used, the image would appear directly in front of the projector (although it might be possible to shift it up or down, or to left or right a relatively small amount, depending on the projector) and in order to get the primary image in a useful position on the screen and the secondary image on the floor or ceiling, the projector would have to be substantially tilted. This would result in the primary image being distorted and some compensation having to be made either using on-board adjustments available in the projector or via some external image processing software or device. In either case, the image will suffer a loss of resolution as a result, and this is clearly a more complicated and less desirable situation, so often an off-axis lens is preferred.

All of the techniques described herein are valid with any kind of lens or projector set-up and it should be understood that the technical choice of lens will ultimately be made according to the specifics of each situation. Indeed, equipment other than traditional projectors can be used to make hologram effects. Improvements in moving light technology mean fixtures such as the Robe MiniMe (Registered Trade Marks) now include video projection capabilities, and entertainment lasers are getting more and more sophisticated such that it is foreseeable that laser imagery may also be utilised in combination with a hologram image projection screen to make these kinds of effects.

A back wall as the secondary image surface is the most problematic position for the secondary image, simply because it is very visible to a viewer and the visual connection between the main image and the secondary image is extremely obvious; they are identical except that the secondary image will be bigger, and that repetition of the image further draws attention to its presence. A secondary image on the back wall is hard to hide with conventional techniques such as putting more light over the secondary image in order to hide it because it risks making the main image too transparent from certain viewing positions. It is often impossible to block completely using physical masking, so different techniques are often used to try and break the image up, such as using another mesh fabric layered over the back wall, adding pleats or tucks into the fabric at the back wall to create uneven projection surfaces or using lustrous or silky type fabrics which reflect the light. Alternatively, one may try to project from a position such that the secondary image does not line up directly with the main image from an audience viewpoint and reduce the visual connection between the two. This can be achieved using off-axis lenses or tilting the projector to place the image where it is less problematic, and correcting any resultant distortions in the image. This can be done in any plane or axis, and the more that the secondary image can be 'disconnected' from the main image by moving it out of the same sightline, the better.

The light from a projector diverges as it gets further from the lens making a larger and larger image as it gets further away, so a secondary image gets dimmer and larger the further from the projector it goes. Hence, any technique that allows the light to travel a longer distance without hitting a solid object will make the image dimmer and easier to overcome.

In order to make the projected object or person appear to exist in the real-life 3D background, there must be no background present in the projected content, and the projected entity should ideally be complete and wholly contained by the video projection area. This can be achieved either by filming the subject against a black background, or by using greenscreen, bluescreen or other digital content techniques to remove the background from a filmed scene and allow it to go to black. It is not possible to project black (which is the absence of light) as the projector projects nothing, meaning that the black areas of the video content will go transparent when projected onto a gauze mesh screen, and the necessary lit background behind the gauze mesh screen can be seen.

For reasons of practicality, large scale hologram effects are often projected onto semi-transparent gauzes or fine nets (otherwise known as 'scrims', 'sheers', 'voiles' or 'tulles') which are well known for exhibiting the twin properties of solidity and transparency under different lighting conditions, which are often exploited on stage as a 'gauze reveal': i.e. a scene is hidden behind a gauze, which is front lit and therefore opaque. Reducing the brightness of the front light, and lighting up the scene behind the gauze makes the gauze transparent, and the scene is thereby revealed. This technique has been in use for decades with both still and moving images, and has been well documented.

Therefore it is possible to present an image projected onto a mesh gauze to an audience sitting in an area of relatively low light levels, and to light the background surrounding the projected area behind the mesh gauze screen and give the effect of a solid 3D entity existing in the background space. The mesh gauze screen is easy to transport and deploy, and does not involve the inconvenience of having to handle large, brittle or fragile materials which are difficult to use or manufacture in single sheets large enough to make life size representations of subjects such as people or cars; but for smaller applications a wider variety of materials is commonly used. A preferred gauze mesh fabric projection screen surface includes real silver (Ag) in the screen construction to enhance the brightness (or gain) of the projections without compromising the transparency necessary to make the hologram effects work.

The 'silver screen' of old used real silver for just this purpose, but silver is expensive to use and tarnishes over time on exposure to oxygen so that the brightness of the screen accordingly deteriorates over time. An alternative method of improving the gain of gauze screens is to use a cheaper tulle or net fabric and coat it with a highly reflective paint. Usually the gauze screen is black, although other colours may be used. This improvement in the gain is currently achieved by spraying the gauze with a silver screen paint, which greatly improves the brightness. However, when the screen sizes are relatively very large, this is difficult and expensive to do, and involves hiring studios with a large floor space and access to equipment such as towers or lifts to allow people to spray the paint over the whole of a screen surface that may exceed around 7.5 metres in height. The result tends to be an uneven and patchy coverage, and any runs in the paint are particularly problematic as they will be noticeably visible in projections onto the screen. Furthermore, the studio has to be hired until the screen is completely dry. It would be far more convenient to print a reflective coating onto the gauze. Modern fabric printing is now available up to and beyond widths of 5 m, and it is possible now to print onto fine fabrics. This makes printing the coating on to the fabric a highly suitable process for applying it in a clean and economical way, with the added benefit that the application is computer-controlled and very even. Alternatively, screen printing is a traditional method of applying designs to fabric, and roller screen printing is a more modern and quicker way of screen printing onto larger quantities of fabric; either technique could be utilised to apply the coating onto the gauze. Again, this would have the benefit of a more even application. Screen printing is normally limited to fabrics of 3 m width, although larger widths are not excluded should they be required. In either case, it is desirable that the resultant projection screen is also flame retardant. This can be achieved either by using an inherently flame retardant gauze fabric such as a 100% polyester, or another non-flame retardant fabric that has been treated for flame retardancy before the coating is applied, such as a cotton gauze fabric. Alternatively, a flame retardant substance can be added to the coating, or the coated gauze is flame retarded separately after the reflective coating has been applied. It is preferred that the fabric is flame retardant before the coating is applied, and if further flame retardancy is required to achieve a particular standard, a combination of flame retardant processes applied before and after the coating is applied could be used.

Lighting is very important throughout the whole process of making a credible-looking hologram on a gauze projection screen. When the hologram is shown to a viewer, there will be real, physical lights present which must be carefully controlled to give a good holographic effect.

Firstly, there must be no more than low levels of light in front of the gauze mesh screen compared to the area behind the gauze mesh in order that it can go transparent and the presence of the screen not be perceived by the viewer. If the light in front of the gauze mesh screen is too bright, it will always be evident that there is some kind of surface present which is producing the effect. This not only gives away the illusion, but also tends to make the image look 2D and flat. Secondly there must be light behind the image in order to make the gauze mesh screen go transparent and create the impression of a 3D space behind the screen which the hologram inhabits. This light needs to be bright enough to make this effect work and make the scene look realistic and balanced overall, but the light must be carefully placed because if there is anything more than the dimmest of lights lining up with the projected image, the viewer will see the light behind the image and through the image, and the image will appear to be transparent as a result. Occasionally transparency is a desired effect, but it is incompatible with a person, for example, looking wholly real. This requires that the lighting is considered from all possible audience viewing positions in order that the image retains its integrity. Thirdly, the video content should appear to behave in a way that is consistent with the surrounding lighting. This means that lights should be positioned in such a way that it appears to the viewer that these lights are creating the effects seen in the video content. This cause and effect connection between real world elements and the video content powerfully enhances the impression that the holographic elements are real, because it appears that real elements around the image are affecting it. There are different ways that this can be achieved. Depending on whether you are filming an object or person, or creating them digitally, in order that the hologram image is bright and visible in the end content, it has to be lit. In the case of a real object or person that is filmed, this means that real lights are used during the filming process. In the case of digital content, or filmed content that is digitally manipulated, the lighting effects may not come from real lights, but from lighting parameters programmed into the content creation software that artificially creates lighting effects mimicking those in the real world. Either of these techniques can be used to make sure that the lighting around the hologram and in the hologram content are consistent when the hologram is viewed. These techniques which are disclosed in WO2010007426 with regard to Pepper's Ghost images are also valid when used with direct projection.

It is very important is that the colour temperature perceived in the video hologram appears to match the colour temperature of any lit objects or people surrounding it. This is most critical when the hologram subject is a lifelike person and there are other real people around it that form an immediate comparison. If they all look like they are lit with the same lighting, it enhances the belief that the hologram is also a real person; conversely it makes it difficult to believe the hologram is real if the hologram is for example lit in cold white light, but other people around it are lit in a warm white making the hologram look different to the real world surroundings, and therefore unreal.

This effect can be taken further, where more extreme lighting effects used around the hologram are incorporated into the hologram content to make it feel authentic. For example where the hologram is a musician or singer who is to appear as part of a concert, there may be various lighting effects used to enhance the performance, such as flashing, moving and/or coloured lighting, or lights projecting still or moving patterns. If similar effects are also seen in the hologram content to those used on stage, it makes it look like the hologram is actually being lit by the concert lights on stage, which greatly enhances the overall realism of the hologram. Most performances on stage and on TV use white light to light a performer's face, in which case the result of this more dynamic lighting will be mostly seen in the backlights and sidelights, but it may also be desirable to put the matching lighting effects into the front light seen on the image to mimic real lights seen surrounding the hologram when it is finally viewed. The most effective way to ensure that the lighting seen when a hologram is created matches up with the lighting seen on stage when it is executed as the finished effect is to design (at least in outline) the lighting that will be used in the final staging before the hologram content is created. This means that certain decisions are made regarding the main features of the lighting that will be used in future in any particular song or performance. The most obvious decision will be the colours used, but it may also include effects such as strobes, and the way any lighting changes are to happen. For example, the lights might flash quickly in a rock song, fade slowly in a ballad or bump from one colour to another in time with a drum break. This is a big change to the normal workflow when typically the live event lighting designer will not have any involvement with the lighting used to create the content; he or she will normally only see the finished content and be trying to design the event lighting to match what is evident in the content, which at this point is not normally possible to change. Normally, this means that no concert-style lighting is included in the content because the types of lights used for filming are usually static and white. They are not generally strongly coloured, or able to move or flash, and as a result it makes it extremely hard for the end performance lighting designer to reconcile a non-dynamically lit image with the requirement for a normal-looking concert stage with a show of moving and colour changing lights. It is far more effective for the lighting to be designed and even pre-programmed before the content is made, and for the fixtures which are planned for the final hologram performance to be deployed in similar positions running similar cues and be captured as part of a filming process. It may not be possible to set up the full rig of real show lights so far in advance of both the final execution and also the film shoot, but offline simulation programs such as Cast Software's WYSIWYG mean that this process can be done without having to hire the lights and a venue in which to build the system. This means that the lighting designer for the content creation (or Director of Photography (DoP)) and the end performance lighting designer should be in communication regarding how these lights and effects are going to be set up so they area filmed or created to appear correctly, and this will almost always mean that the end performance lighting designer is hired and the lighting is designed, planned and programmed a lot earlier in the production process than would normally be the case. As different fixtures are typically used in film shoots and live events or shows, and different lighting skill sets are required in each environment, it is not normal for film lighting designers/DoPs to work in live events, and vice versa, hence the need for this communication channel to be created. It should be noted that it is not necessarily the case that the whole end performance lighting rig is brought into the film shoot. Sometimes just one or two fixtures creating a visual reference visible on the filmed subject is all that is required. The lights themselves and any light beams visible through smoke or by other means would not normally be part of the content, although this eventuality is not excluded. Where the lighting seen in the content is not filmed but is produced digitally, the end performance lighting director should be similarly consulted as to the kinds of lighting effects that by preference should be evident in the content, and should a means be available whereby the offline lighting pre-programming can be used to inform, demonstrate or directly control the lighting effects digitally created in the content, this should be utilised as far as the technologies will allow.

SUMMARY OF THE INVENTION

According to a first aspect of the present invention, there is provided apparatus comprising a projection device for projecting an image, a transparent projection screen for displaying the projected image and a secondary image surface on an opposite side of the screen to the projector device, wherein the secondary image surface includes a plurality of strips of material.

Owing to this aspect, the plurality of strips of material are used to reduce a secondary image where it is appears on the secondary image surface behind the primary hologram image on the projection screen.

The plurality of strips may present themselves in any number of different ways, such as string, threads/yarns, fabric, chains, strings of beads or strips of similar smaller parts such as sequins, or plastics strips. They may be made of any suitable material such as fabric, foil, metal or soft or hard plastics. The strips may be formed in any suitable manner, such as individual strips or they may be formed in one piece of material, covering at least part of the secondary image surface, which is at least partly divided into strips. In addition, there may be joins between the strips, or be a solid piece of material that is in part divided into strips, especially at the position where the secondary image would appear. They may be flexible or rigid. Preferably, they are shiny, although matt or other finishes are not excluded. Preferably, they made from thin strips of shiny non-metallic foil, although metallic foils are not excluded either. When the secondary image lands on the individual strips, each part of the image lands on a different surface offered at a slightly different angle to the incident projected light. The individual strips will therefore reflect the light in different directions, especially when the strips are shiny, importantly bouncing the light away from the viewing area. A particularly preferred version of the strips are those of shiny dark coloured material. The colour black is preferred over other dark colours, but the strips may also be transparent arranged in front of another dark coloured surface. Alternatively transparent strips may be arranged in front of lighting fixtures, video screens or projections in order that light or images from these elements may be visible. The strips can be arranged horizontally or vertically although other arrangements, including loops, swags or clusters, are not excluded. A structure with a series of cut ends held by a soft or hard central retaining member so that the result resembles tinsel or a bottle brush may be used. In one embodiment, a black slash curtain (also known as a slit drape) may be used.

The secondary image is bounced differently off each of the thin strips, which tend not to hang perfectly parallel, but twist slightly relative to one another. The strips are preferably joined at one end in a header which makes it easier to handle.

The thinner the strips are, the greater the effectiveness of the technique as the more the image is broken up and bounced in different directions. However, this kind of shiny material is often a fairly fragile BoPET (biaxially oriented polyethylene terephthalate) such as mylar (Registered Trade Mark) or similar plastics foil material, so there may be a practical limit on how narrow the strips can be and maintain enough strength not to tear off from the header. A width of around 1 mm to around 100 mm wide is preferred, however no maximum nor minimum limit is specified provided there are, advantageously, at least two strips present. The strips should cover any area on the secondary image surface, which may be a back wall surface where it is desired to reduce the effect of a secondary image, but it is preferable to cover the whole of the back wall in order to create a more visually attractive and uniform background. A preferred version is effective in reducing the secondary image by around 70-95% of its original intensity.

In another embodiment, multiple layers of strips can be laid over one another in order that there are no gaps where the strips overlap, however even a single layer of strips will offer an improvement over no strips. There is no maximum number of layers specified; however once enough strips are used to fill all the space without gaps, there is no benefit to be had in adding more unless air movement is expected, in which case further layers may be added to ensure full coverage even when the strips move. Preferably, there is separation between the layers of strips, with each layer lying in different substantially parallel planes at different distances from the projector. The distance between the different layers of strips is preferably around 10 cm, but this could vary depending on a number of factors.

In a further embodiment, shiny black strips are lit in order to provide the necessary lighting effects to make the hologram look 3D and credible. The lights may be located in front of or behind the strips or layers of the strips. The strips may be directly lit or light may be visible through the strips in order to give the 3D effect. Where layers of strips are used, the layers may be thinner in areas where it is desirable to see lighting through the strips.

In yet another embodiment, the strips are made of a flame retardant material such as polyester or flame retardant PVC. Solid black slit drapes come in standard lengths up to 7.3 m and made of 100% polyester, hence inherently permanently flame retardant with no further treatment required.

In still a further embodiment, the strips are used in other orientations around a hologram projection where the secondary image is being created, such as on side walls, a ceiling surface or to cover a floor surface.

In still another embodiment, the strips are held in position at one or more intervals throughout their length in order to prevent excessive movement owing to air movement or other factors. This may be achieved by using adhesive tape; thin string, yarn or line, pins, clips or any other fastening device whose function is to restrict the movement of the strips while the means of achieving this should be as inconspicuous as possible in use.

In yet another embodiment, shiny adhesive tape which is clear or of a colour matching the strips is used on the front of the strips. The shiny or matching surface of the tape will also reflect light and render it largely invisible.

In still yet another embodiment, the strips are coloured or shaped such that they add to the presentation environment in their own right. For example, blue strips may be used with or without additional lighting behind holographic images of fish and sea life to make underwater effects around them. For example, strips may be coloured green and styled to look like seaweed.

In still yet another embodiment, the strips are transparent and allow a light-emitting device to be seen through the layers of strips. The light emitting device may, for example, be a lighting fixture or it may be an LED video screen. In yet another embodiment, the strips are transparent and allow further video projections to be seen through the strips or layers of strips.

In another embodiment, the strips in any of the arrangements above are sewn, glued or otherwise attached to a larger back cloth or other sheet of hard or soft material in order to make them easier to handle.

In a still another embodiment, a further semi-transparent material can be placed in front of the strips of material comprising at least one of a solid material with holes in it to allow light to pass through it, such as a black sharks tooth gauze, or a solid piece of a transparent substance such as a clear PVC.

A solid hard or soft surface in a dark colour may be placed behind the strips in order to provide a defined space past which it is not possible for the audience to see in the manner of any other backdrop or side curtain normally used in the stage or other display area, and to prevent people from trying to walk through the plurality of delicate strips.

The secondary image surface may be covered with a black back cloth hanging down from a bar or truss together with, in front of the black back cloth, several layers of approximately 90 cm wide black slit drape curtains provided with a suitable fastener on their top edge which are hung in different substantially parallel vertical planes from further bars or trusses so that the slit drapes are at different distances in front of the black back cloth. This fastener may be Velcro or adhesive tape, or a header fitted with devices such as eyelets and ties that enable the plurality of thin strips to be more conveniently handled and damaged sections of strips can be replaced in a modular fashion.

The strips could be made of a material that may be crushed or creased to make them hang less straight. This may be done deliberately, or it may be the advantageous side effect of repeatedly using a set of strips resulting in a product whose performance improves with use.

If the strips are moved slightly owing to naturally occurring air movement or forced air movement by a mechanical device or by any other means, the air movement may improve the reduction in visibility of the secondary image on the secondary image surface provided by the strips with respect to the presented projected light, because the locations from which the strips directly face the viewer and light is reflected back as a visible image keeps changing. The strips may be additionally restrained to prevent excessive movement leading to gaps occurring between the strips.

According to a second aspect of the present invention, there is provided apparatus comprising a projection device for projecting an image, a transparent projection screen for displaying the projected image and a secondary image surface on an opposite side of the screen to the projector device, wherein said surface includes a plurality of reflective elements.

Owing to this aspect, the plurality of reflective elements are arranged to scatter away from a viewer light reaching the secondary image surface from the projection device.

Advantageously, the reflective elements are used on a back cloth or a sheet of hard or soft material located immediately in front of and substantially covering a back wall surface and are used to reduce the appearance of the secondary image where it would be seen on the wall behind the primary hologram image. Preferably, the small reflective elements are opaque or, alternatively they may be transparent or semi-transparent, but most advantageously they are black in colour. They may have a plain shiny finish or a surface diffraction coating. The surface may include any number of pieces of material used to cover the any part of the area where the secondary image would appear. In one version, a back cloth is covered in reflective sequins which, advantageously, overlap each other to form a solid surface which is substantially lightproof, although some gaps may be present between the sequins. The sequins may be of any suitable shape or size, and any relatively thin materials cut into any shapes such as rectangles, strips or teardrops should be considered as sequins, and formed to be flat or planar or alternatively may be moulded, folded or creased into shapes that occupy more than one plane.

In a second version, substantially non-planar elements may be used and these may be of any shape or size or colour. Such non-planar reflective elements are herein called beads.

The beads or sequins may be arranged in any possible configuration including regular patterns as well as random arrangements. There may be different kinds of beads or sequins used and a mixture of beads and sequins may appear together, and may be combined with strips of material, or threads.

Threads are strands of shiny material which may be incorporated into a larger hard or soft substrate which may be planar, may present as a string or yarn, or may advantageously be a fabric. The ends of the threads may protrude giving a fringed effect, or they may be incorporated neatly into the substrate. The shiny threads may form a large or a small percentage of yarns used in the substrate depending upon the particular circumstances. The yarns are advantageously black or a dark colour, or transparent in a substrate that is advantageously black or a dark colour or transparent.

It should be understood that all the deployments, uses, arrangements and embodiments envisaged in the first aspect shall also apply to this second aspect, and the mixing and substitution between strips and sequins and beads and threads may be performed unrestrictedly.

It should be understood that the essential characteristic of strips, beads, threads and/or sequins is that they all are arranged to scatter light from the projection device. They are so arranged because they present a variety of differently angled surfaces relative to the incident light from the projection device. As a result, the viewer can only see an image comprised of the light reflected back to them, so the more light that is scattered elsewhere, the dimmer the secondary image will appear to be. The method by which the strips, beads, threads and/or sequins is held in position is a matter of convenience according to the exact requirements of the environment in which the hologram is to be viewed.

It is to be understood that these methods will work on any secondary image surface where a secondary image would appear, be it any wall, floor, ceiling or other surface, but it is recognised the impracticality of using strips, beads, threads and/or sequins on a floor surface where such floor surface needs to be walked upon.

According to a third aspect of the present invention, there is provided apparatus comprising a projector device for projecting an image, a transparent projection screen arranged to display the image projected from the projection device as a primary image and a secondary image surface on an opposite side of the screen to the projector device and on which a secondary image is projected, wherein the secondary image is arranged to be projected toward secondary image outlet means.

Owing to this aspect, the secondary image almost completely disappears in the area of the secondary image outlet means.

Preferably, but not necessarily, the secondary image outlet means is covered with a transparent panel such as a glass pane. The secondary image almost completely disappears in the areas where it hits the glass. Preferably, it is dark enough outside the secondary image outlet means that any light seen through the secondary image outlet means from any viewing position does not interfere with the hologram and make it go transparent.

In one embodiment, the vista seen from the secondary image outlet means is advantageously deployed as the background to the hologram image and the lighting coming through the secondary image outlet means adds to the depth illusion required to make the hologram look real. In a second embodiment, it can be arranged that it is extremely dark outside so no light or scenery can be seen through the secondary image outlet means, and the depth effect is created using normal lighting behind the hologram image. In a third embodiment, the projection screen is positioned relatively close to the surface which has the secondary image outlet means in it than would normally be considered. The view from the secondary image outlet means may be used to give the 3D depth needed to create the 3D effect in the hologram. The secondary image that would normally appear very visibly on the secondary image surface such as a back wall surface and which would line up with the main image in a highly detrimental fashion is enormously reduced because the secondary image passes through the secondary image outlet means and is mostly eradicated. If the transparent panel becomes dirty, the dirt will reduce the amount of the light in the secondary image that is able to pass through the secondary image outlet means and make the secondary image brighter, so it is recommended that the transparent panel is kept clean. In a further embodiment, the secondary image outlet means is a floor-to-ceiling window that comprises the entire backdrop to the hologram-type image when viewed by an audience looking out on a cityscape from an elevated floor in a building.

Where a secondary image is designed to be hidden by projecting it on a floor surface, the floor surface can include a transparent or semi-transparent floor surface. In this way, a secondary image appearing on the floor surface is transferred downwardly through the transparent or semi-transparent floor surface to a level below the upper functional floor surface level, where the secondary image is not visible to an audience.

Such transparent or semi-transparent floor surfaces may be in the form of grids, meshes, clear or tinted acrylic or glass or similar which allow the secondary image to be broken up or transmitted through the floor surface without creating a significant secondary image on it. In one embodiment, a sloping grid floor in which the sides of the grid are angled to line up with the angle of incidence of the incoming projected light from the projection device can be used.

DESCRIPTION OF DRAWINGS

In order that the present invention can be clearly and completely disclosed, reference will now be made, by way of example only, the accompanying drawing, in which:—

FIG. 1 shows a perspective view of a known image projection system,

FIG. 2 shows a view similar to FIG. 1, but of a system according to the present invention, FIG. 3 shows a view similar to FIG. 1 and of another known projection system, FIG. 4 is a side view of the known system of FIG. 3, FIG. 5 shows a perspective view of a further known image projection system FIG. 6 shows a view similar to FIG. 1, but of another system according to the present invention, FIG. 7 shows a view similar to FIG. 6, but of another system according to the present invention, and FIG. 8 shows a view similar to FIG. 6, but of an alternative system according to the present invention.

FIG. 1 shows how a secondary image 4 is created on a secondary image surface in the form of a back wall 2 of a display area in which an on-axis projection device 8 projects a primary image 3 onto a transparent projection screen 1. The primary image 3 is completely contained within a projection area 6 of the projection device 8. The image 3 has a black background so the edges of the projection area 6 blend into the areas of the transparent screen 1 that do not have projection on them, so it appears to a viewer 7 positioned on the same side of the projection screen 1 as the projection device 8 that the image 3 is floating in free space. However, light travelling from the projection device 8 not only creates the primary image 3 where it hits the transparent projection screen 1, but some of the light passes through the projection screen 1 and continues to travel along a straight path indicated by arrows 5 to form a secondary image 4 on the secondary image surface 2 where the light hits. The secondary image 4 is magnified in size and reduced in brightness compared to the primary image 3. The duplication of the primary image 3 by the secondary image 4 is detrimental to the desired effect, namely that the primary image 3 is a real and independent entity that exists in free space.

FIG. 2 illustrates how adding a plurality of strips of material, in this example shown by shiny strips 10 that are preferably black in colour and positioned in front of the back wall 2 can substantially reduce the appearance of the secondary image 4. Strips 10 are held at the top edge by header 9.

FIGS. 3 and 4 show known arrangements that attempt to deal with the secondary image that appears on a floor surface between the back wall 2' and the projection screen 1'. An off-axis projection device in the form of an ultrashort throw projector 11 projects a primary image 3' onto the transparent projection screen 1'. Image 3' is completely contained within the projection area 6' of the projector 11. Image 3' has a black background so the edges of the projection area 6' blend into the areas of the transparent projection screen 1', so it appears to viewer 7' that the image 3' is floating in free space. Light travelling from the projector 11 creates the primary image 3' where it hits the transparent projection screen 1', but some of the light passes through the screen 1' and continues to travel along a straight path indicated by arrows 5' to form the secondary image 13 on a floor as the secondary image surface. A non-transparent piece of masking 14 is used to hide the secondary image 13 from the viewer 7'. The requirement for the secondary image 13 to land on the floor means that there is a minimum distance between the transparent projection screen 1' and the back wall 2'. If the distance between them is too little, the secondary image 13 will start to appear on the back wall 2'.

FIG. 5 shows what happens when the secondary image surface 2 is not far enough away from the transparent projection screen 1 to allow the secondary image 13 to fall completely on the floor (as described above in relation to FIGS. 3 and 4). Part of the secondary image 13 appears on the back wall 2 where it is difficult to conceal from the viewer 7, and makes the overall effect less credible.

FIG. 6 shows a similar arrangement to that of FIG. 1. However, a secondary image outlet means 15 is made from a glass window, at least in the area where the secondary image appears. In this arrangement, virtually no secondary image is produced because most of the light continues to travel through the glass outlet means 15 and doesn't make an image.

FIG. 7 shows an arrangement similar to FIG. 5, wherein the secondary image surface 2 is a glass window as the secondary image outlet means at least in the area where the secondary image part 16 falls on it. No secondary image would appear to the viewer 7.

FIG. 8 shows that if the secondary image surface 2 includes a plurality of the shiny strips 10 where the secondary 16 falls on it, the secondary image is virtually eliminated. In both of the cases shown in FIGS. 7 and 8, there would not be a significant secondary image on the secondary image surface 2, so it is possible to reduce the distance between the transparent projection screen 1 and the back wall 2 and still use an off-axis lens without needing to maintain the full distance required to position the whole of the secondary image on the floor to hide it.

In FIGS. 3 to 5, 7 and 8, the secondary image is shown to appear on the floor. In addition to the measures already described at reducing the appearance of the secondary image or independent of those measures already described, the secondary image can be significantly if not completely eliminated by the use of a transparent or at least semi-transparent floor surface. In this way, a secondary image appearing on the floor surface is transferred downwardly through the transparent or semi-transparent floor surface to a level below the upper functional floor surface level on which people are positioned, so that the secondary image is not visible to the audience. Such a transparent or at least semi-transparent floor surface may be in the form of grids, meshes, clear or tinted acrylic or similar which allow the secondary image to be broken up.

For ease of understanding, the principles have been illustrated showing a projector in a raised position above the floor of the display area with secondary images appearing in positions as a result of that projector placement. It should be understood that the projector may also be placed on the floor or to the sides of the display area, and the principles herein still apply.

The invention claimed is:

1. Apparatus comprising
a projection device for projecting an image, a transparent projection screen for displaying the projected image and a secondary image surface on an opposite side of the screen to the projector device towards the light, from the projection device and passing through the transparent projection screen, is directed to form an unwanted secondary image the same as the image displayed on the projection screen, wherein said secondary image surface includes a plurality of reflective elements that reduce the appearance of the unwanted secondary image.

2. Apparatus according to claim 1, wherein the reflective elements are used on a back cloth or a sheet of material located immediately in front of and substantially covering the secondary image surface.

3. Apparatus according to claim 1, wherein the plurality of reflective elements are opaque.

4. Apparatus according to claim 1, wherein the plurality of reflective elements are black in color.

5. Apparatus according to claim 1, wherein the plurality of reflective elements have a plain shiny finish or a surface diffraction coating.

6. Apparatus according to claim 2, wherein the back cloth is covered in reflective sequins which overlap each other and are arranged to be planar or non-planar.

7. Apparatus according to claim 1, wherein the plurality of reflective elements are substantially non-planar elements.

8. Apparatus according to claim 7, wherein the substantially non-planar elements are beads.

9. Apparatus according to claim 1, wherein the plurality of reflective elements are chosen from strips, chains, beads, threads and/or sequins arranged to scatter light from the projection device and thereby reduce the appearance of the unwanted secondary image.

10. Apparatus according to claim 1, wherein the plurality f strips are of a shiny dark colored materiel.

11. Apparatus according to claim 1, and further comprising:
multiple layers of a plurality of strips of reflective elements which are arranged to be laid over one another in order that there are no gaps where the strips overlap, and wherein there is a separation between the layers of the plurality of strips, with each layer lying in a different substantially parallel plane at different distances from the projection device.

12. Apparatus comprising:
a projection device for projecting an image, a transparent projection screen for displaying the projected image and a secondary image surface an opposite side of the screen to the projector device towards which light, from the projecting device and passing through the transparant projection screen, is directed to form an unwanted secondary image the same as the image displayed on the projection screen and wherein the secondary image surface includes a plurality of shiny dark-colored strips of material that reflect incident light and thereby reduce the appearance of the unwanted secondary image.

13. Apparatus comprising a projector device for projecting an image, a transparent projection screen arranged to dispiay the image projected from the projection device as a primary image and a secondary image surface on an opposite side of the screen to the projector device and on which a secondary image is projected, the secondary image surface having an outlet means, and wherein the secondary mage is arranged to be projected toward the secondary image outlet means.

14. Apparatus according to claim 13, wherein the secondary image outlet means is covered with a transparent panel.

15. Apparatus according to claim 13, wherein the arrangement is dark at the secondary image outlet means.

16. Apparatus according to claim 13, the arrangement being such that the vista seen from the secondary image outlet means is used as a background to the projected image and wherein lighting coming through the secondary image outlet means adds to a depth illusion.

17. Apparatus according to claim 13, wherein the projection screen is positioned near the secondary image surface which includes the secondary image outlet means.

18. Apparatus according to claim 13, wherein the secondary image outlet means is a floor-to-ceiling window.

19. Apparatus comprising a projection device for projecting an image, a transparent projection screen for displaying the projected image and a secondary image surface on an opposite side of the screen to the projector device, wherein said secondary image surface includes a plurality of substantially non-planar reflective elements.

20. Apparatus according to claim 19 wherein the substantially non-planar reflective elements are beads.

* * * * *